(No Model.)

E. M. HOWENSTEIN.
THILL COUPLING.

No. 423,892. Patented Mar. 18, 1890.

Witnesses
Villette Anderson,
Philip C. Masi.

Inventor
Eugene M. Howenstein
By his Attorney
E. W. Anderson.

UNITED STATES PATENT OFFICE.

EUGENE MORRIS HOWENSTEIN, OF NAPPANEE, INDIANA.

THILL-COUPLING.

SPECIFICATION forming part of Letters Patent No. 423,892, dated March 18, 1890.

Application filed October 12, 1889. Serial No. 326,784. (No model.)

*To all whom it may concern:*

Be it known that I, EUGENE M. HOWENSTEIN, a citizen of the United States, and a resident of Nappanee, in the county of Elkhart and State of Indiana, have invented certain new and useful Improvements in Shaft-Couplings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
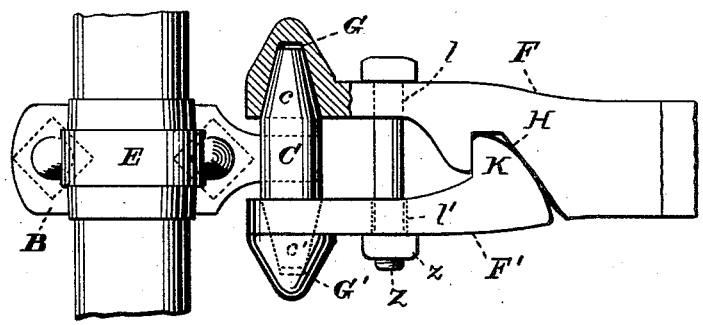
Figure 2:
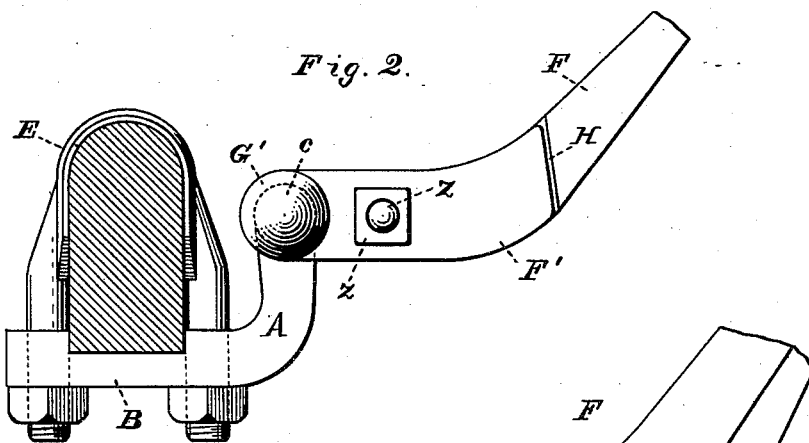
Figure 3:
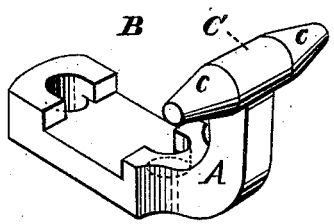
Figure 4:
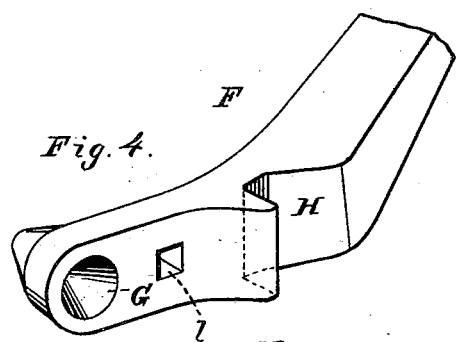
Figure 5:
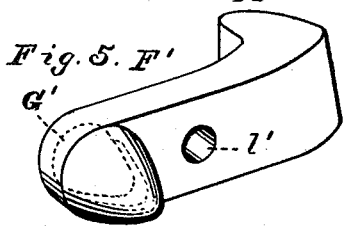

Figure 1 of the drawings is a representation of this invention and is a top view. Fig. 2 is a side view. Figs. 3, 4, and 5 are perspective views of different parts.

This invention has relation to means for coupling shafts and poles to vehicles; and it consists in the novel construction and combination of devices, all as hereinafter set forth.

In the accompanying drawings, illustrating this invention, the letter A designates an arm connected to the attachment-plate B, and carrying at its upper end the transverse conical end bearings C. Usually the arm A and bearing C are made integral with the plate B, which is preferably the clip-plate, and is secured to the axle by the clip-band E.

The end of the shaft or pole arm is indicated at F. It is formed with a conical socket G, opening inward to engage one of the covered ends c of the bearing C. It is also found with a catch recess or shoulder at H, adapted to receive and engage a projection or catch K of the section F′, which is provided at its rear end also with a conical socket G′, opening inward or toward the socket G to engage the other conical end of the transverse bearing C. An opening *l*, usually square, is made through the part F of the shaft or pole arm, and an opening *l′* through the socket-carrying section F′ to provide bearings for the tension-bolt Z, having the nut *z*. When the parts F and F′ are tightened against the conical ends of the bearing C by means of the bolt or tension device, the sockets are brought closely up against said ends and the coupling will not shake or rattle. Should it move loose, it can be tightened in a few moments by turning the nut on the tension-bolt. The shoulder H and catch K of the part F and section F′ are designed to afford strength to these parts, especially in the forward and backward movements of the shafts or pole.

Having described this invention, what I claim, and desire to secure by Letters Patent, is—

The shaft or pole coupling consisting of the clip-plate having the offset, vertical arm, provided with the transverse conical end bearing, the shaft or pole section provided at one end with a conical socket which receives one end of said transverse bearing and inward from said socket, with a recess H, the shoulder formed by one wall of which stands some distance inward from the inner side of said pole-section, the shaft-coupling section provided at one end with a conical socket, which receives the opposite end of said transverse bearing and at its inner end with a catch or hook, which engages said recess and shoulder and stands at its inner end in the plane of said shaft or pole section, and the bolt passing through said pole and coupling sections and spanning the space between the latter, substantially as specified.

In testimony whereof I affix my signature in presence of two witnesses.

EUGENE MORRIS HOWENSTEIN.

Witnesses:
JAS. L. ERNEST,
J. E. TILMAN.